United States Patent [19]

Bowen et al.

[11] Patent Number: 4,678,264

[45] Date of Patent: Jul. 7, 1987

[54] ELECTRICAL AND FIBER OPTIC CONNECTOR ASSEMBLY

[75] Inventors: Terry P. Bowen, Etters; Douglas W. Glover, Harrisburg; Charles D. Hoover, Harrisburg; John H. Huber, Harrisburg; Ronald R. Schaffer, Harrisburg, all of Pa.

[73] Assignee: AMP Incorporated, Harrisburg, Pa.

[21] Appl. No.: 784,275

[22] Filed: Oct. 4, 1985

Related U.S. Application Data

[63] Continuation of Ser. No. 480,569, Mar. 30, 1983, abandoned.

[51] Int. Cl.⁴ .............................................. G02B 6/36
[52] U.S. Cl. .............................. 350/96.20; 350/96.21
[58] Field of Search ................ 350/96.20, 96.21, 96.22

[56] References Cited

U.S. PATENT DOCUMENTS

| | | | |
|---|---|---|---|
| 4,167,303 | 9/1979 | Bowen et al. | 350/96.21 |
| 4,184,070 | 1/1980 | McBride, Jr. | 250/227 |
| 4,217,030 | 8/1980 | Howarth | 350/96.21 |
| 4,252,402 | 2/1981 | Puech et al. | 350/96.14 |
| 4,253,719 | 3/1981 | McGinley | 339/61 M |
| 4,273,413 | 6/1981 | Bendicksen et al. | 350/96.20 |
| 4,406,514 | 9/1983 | Hillegonds et al. | 350/96.21 |
| 4,449,784 | 5/1984 | Basov et al. | 350/96.21 |
| 4,465,333 | 8/1984 | Caserta et al. | 350/96.20 |

Primary Examiner—William L. Sikes
Assistant Examiner—Akm E. Ullah
Attorney, Agent, or Firm—Adrian J. LaRue; Anton P. Ness

[57] ABSTRACT

An electrical and fiber optic connector assembly terminates the electrical conductors and fiber optic transmission members of a cable so that the electrical conductors are electrically connected to electrical terminals latchably mounted in a housing member and for electrical connection to electrical paths of a circuit board and the fiber optic transmission members are optically connected to transmitting and sensing photoelectric devices which are mounted in the housing member and also electrically connected to electrical terminals latchably mounted in the housing member for electrical connection to electrical paths of the circuit board.

17 Claims, 13 Drawing Figures

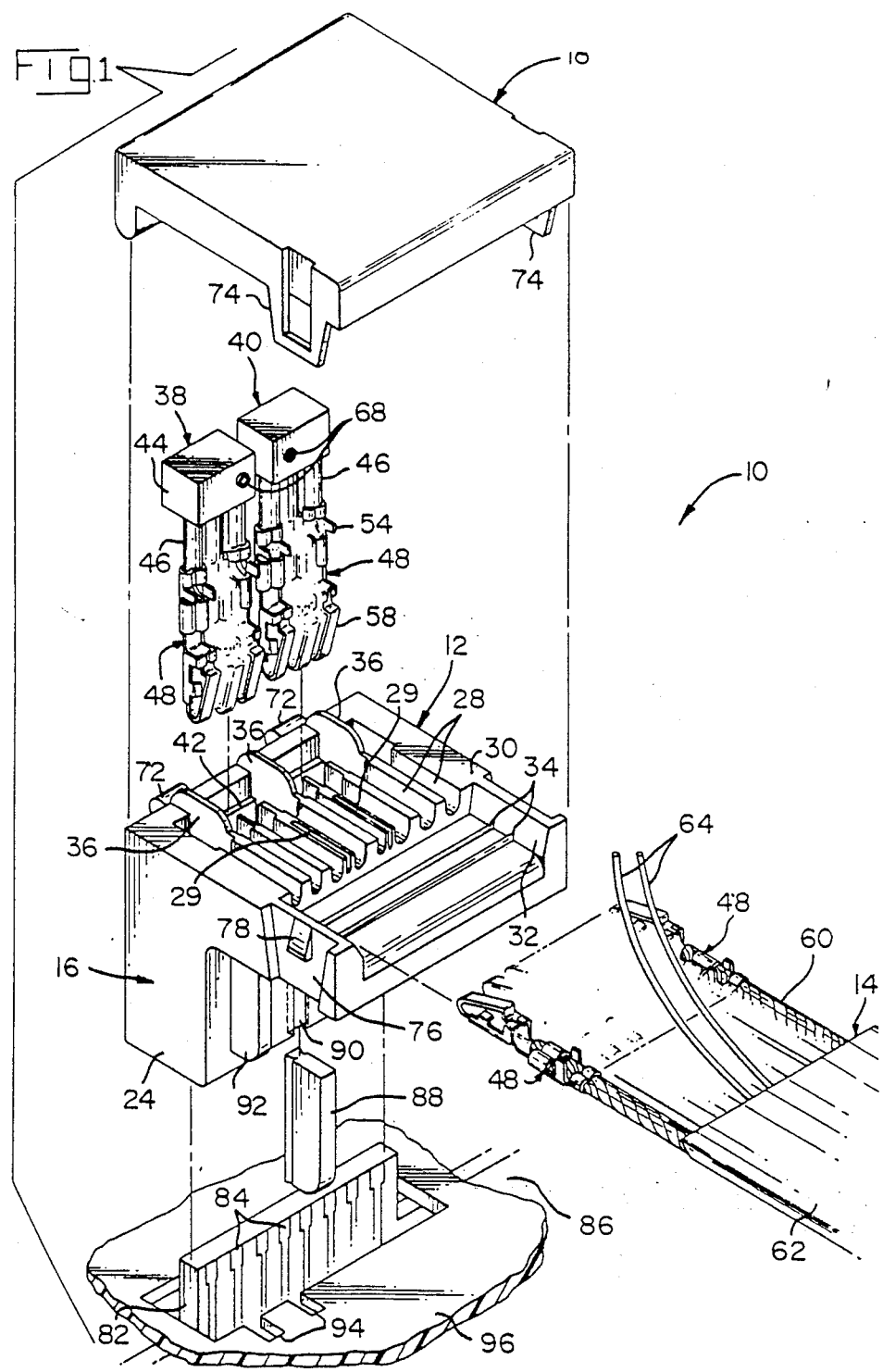

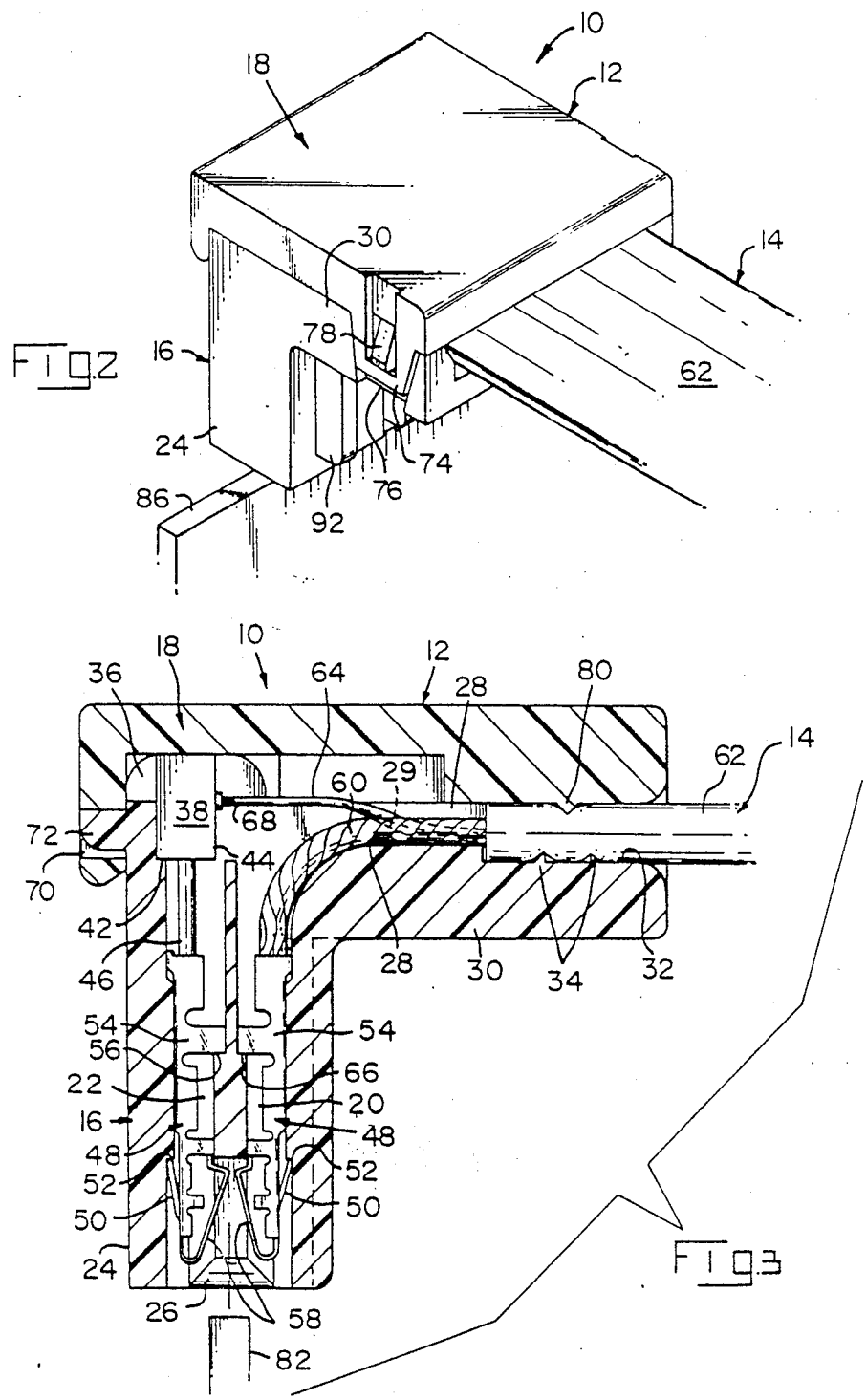

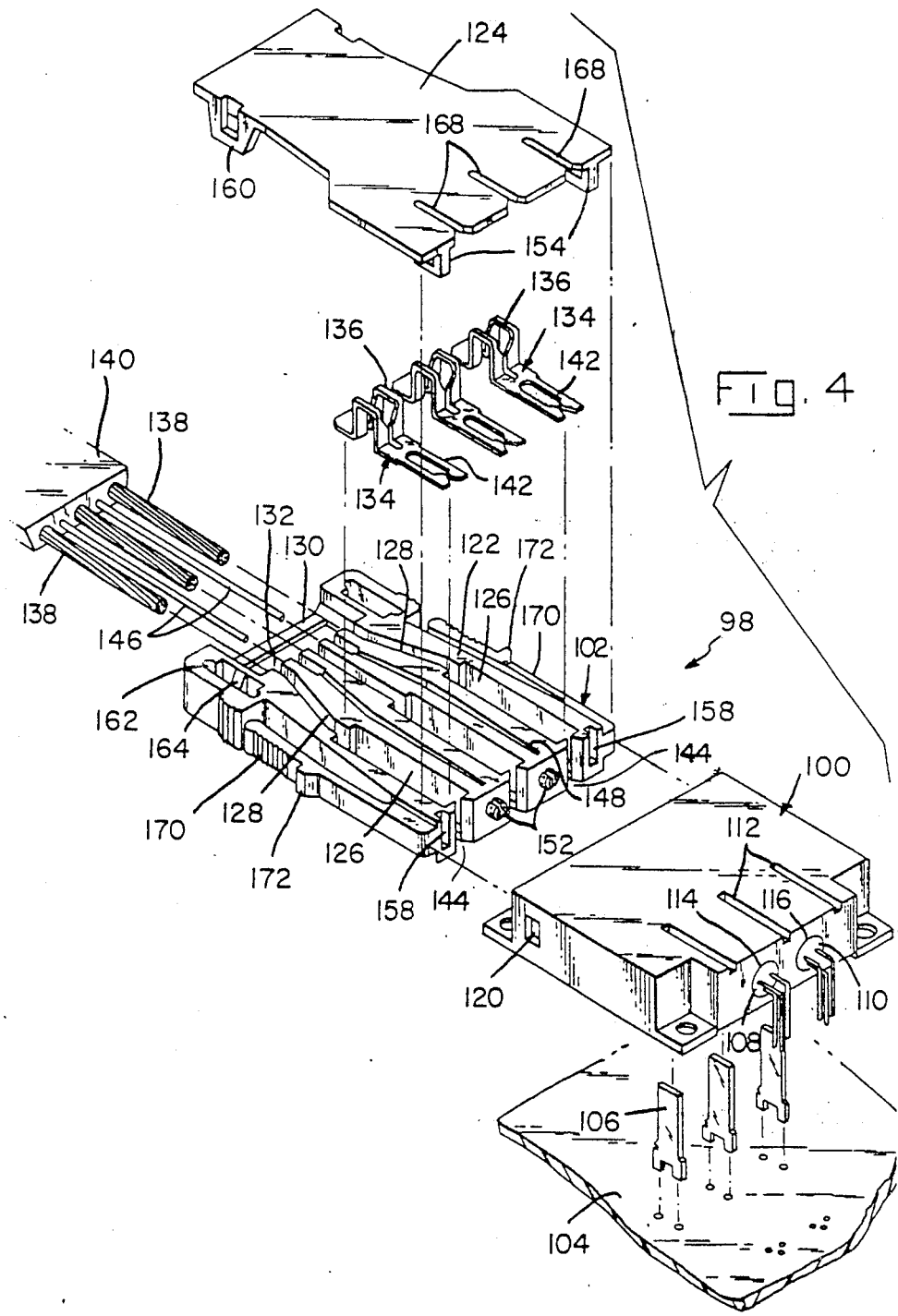

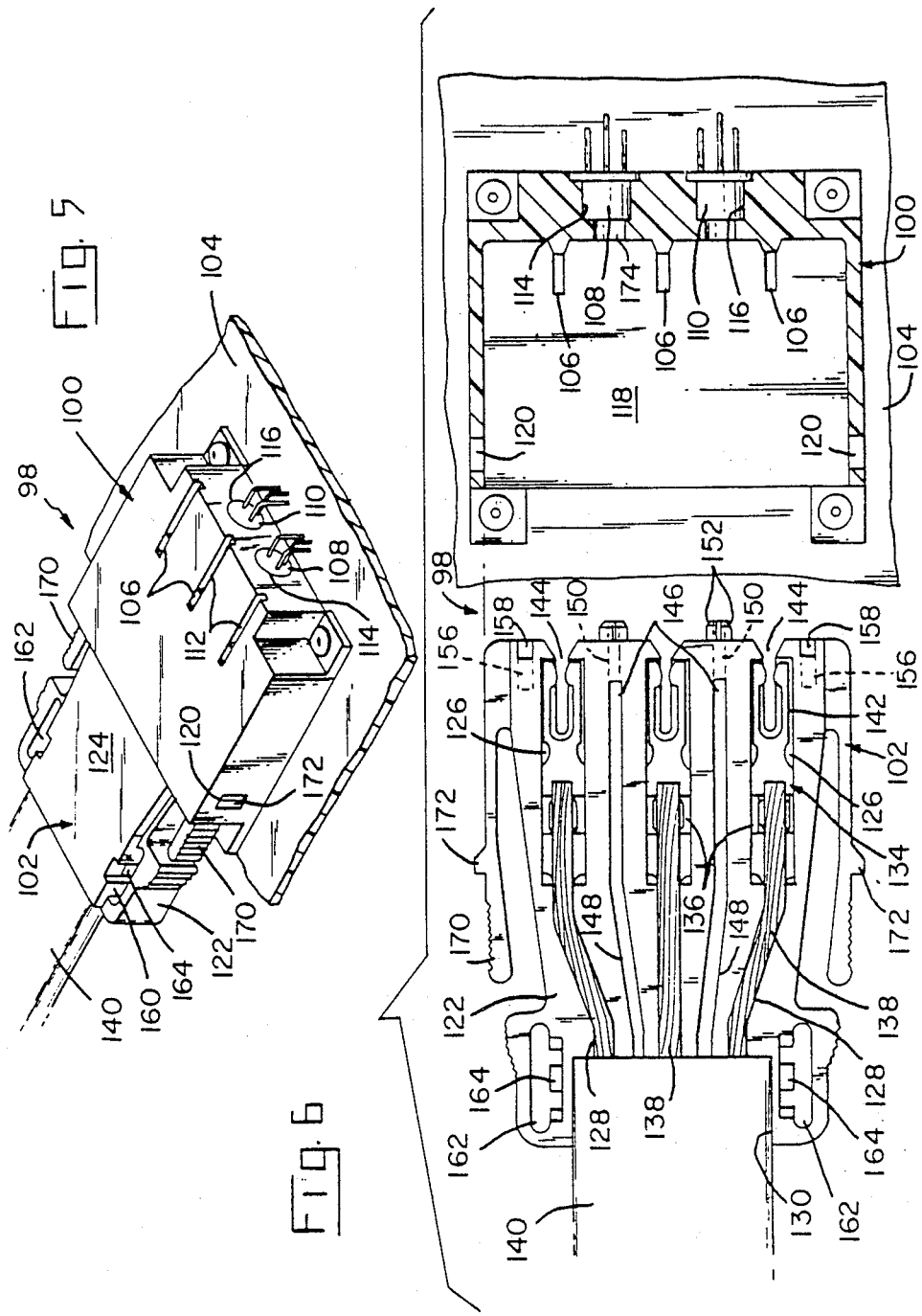

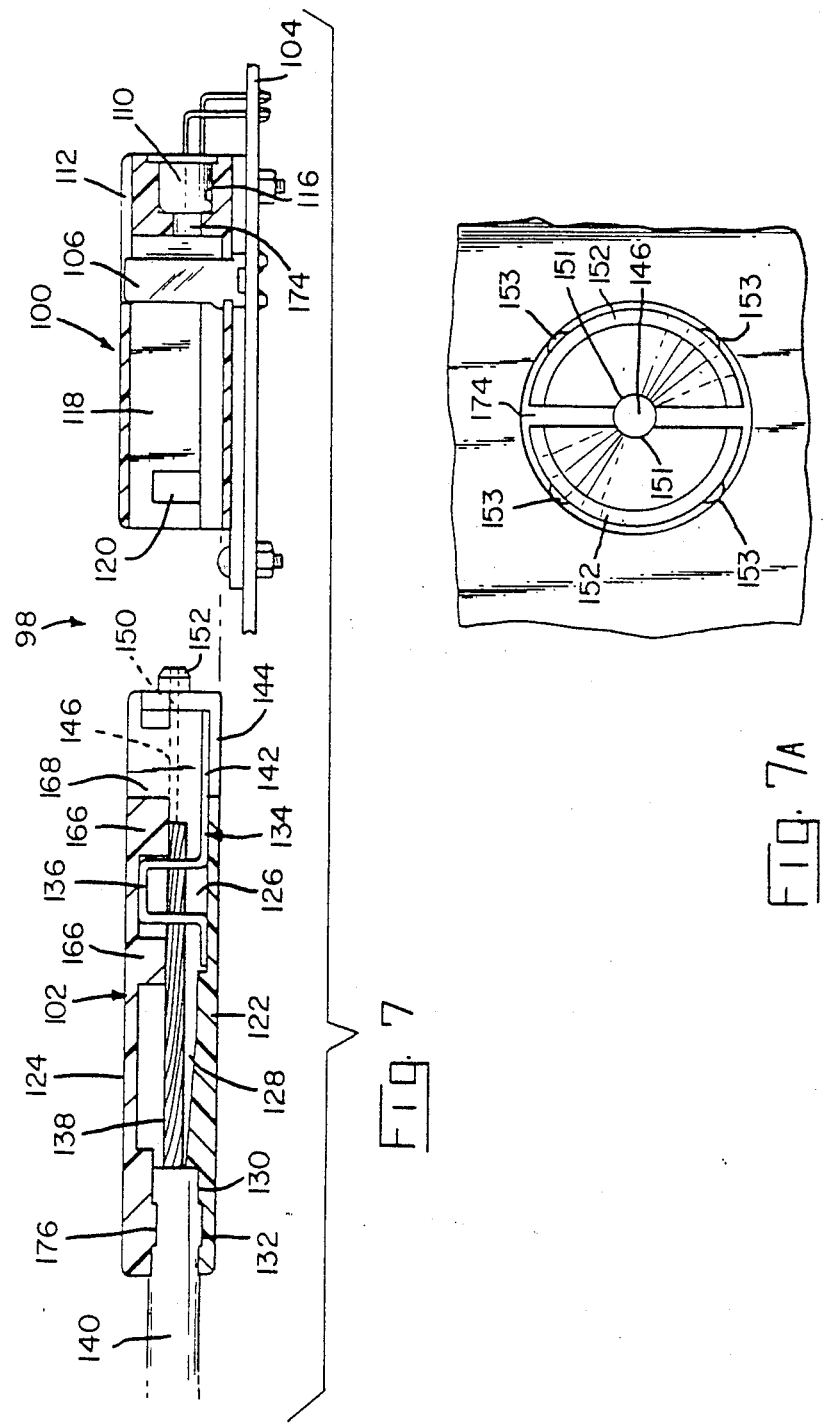

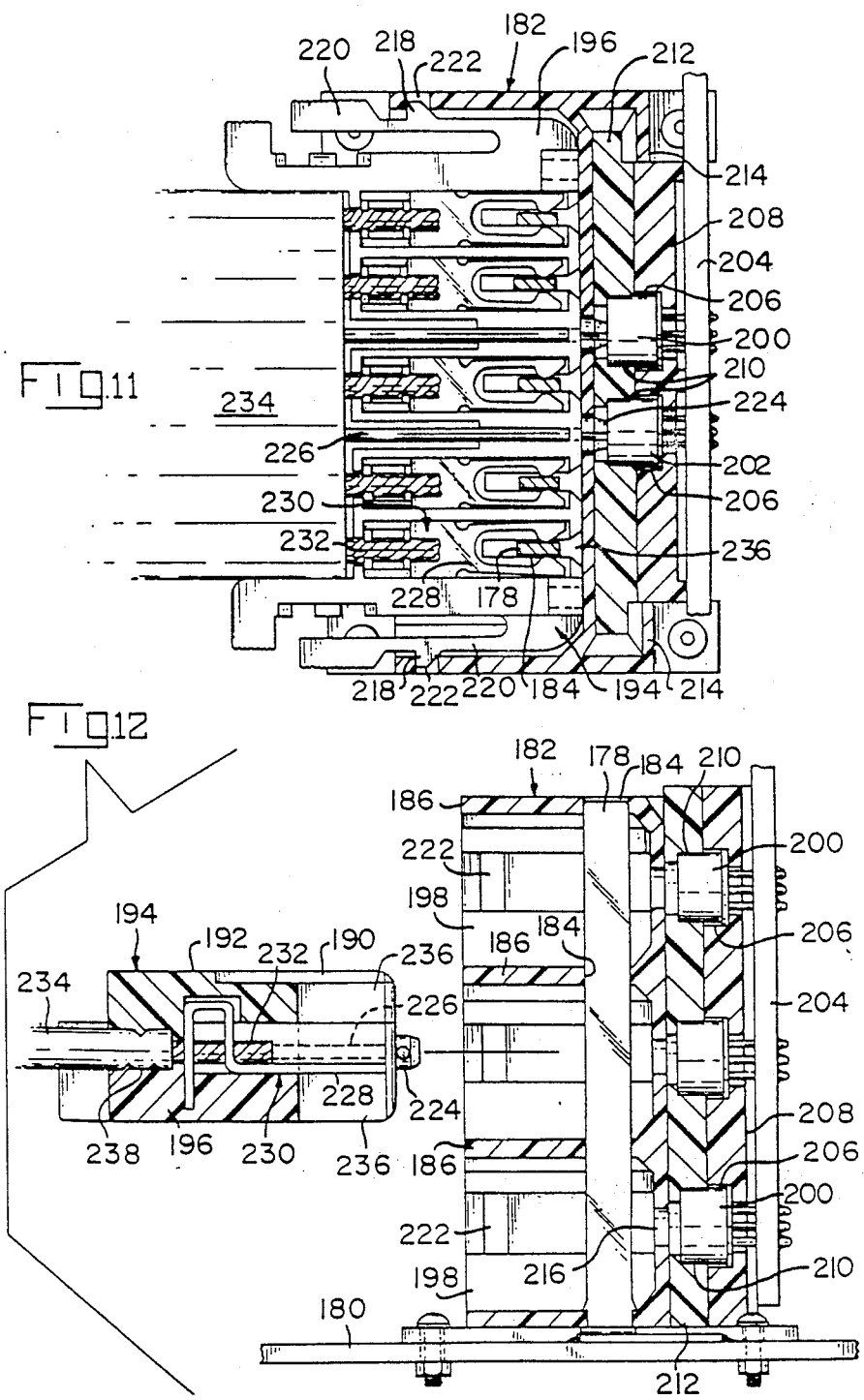

ELECTRICAL AND FIBER OPTIC CONNECTOR ASSEMBLY

This is a continuation of application Ser. No. 480,569, filed Mar. 30, 1983, now abandoned.

FIELD OF THE INVENTION

This invention relates to connector assemblies and more particularly to electrical and fiber optic connector assemblies.

BACKGROUND OF THE INVENTION

Fiber optic transmission members are being used in increasing numbers in conjunction with photoelectric devices as part of transmitter and receiver packages for connection with or as part of electronic circuitry of electronic equipment. The cables in which the fiber optic transmission members are disposed can also include electrical conductors for supplying electrical power at different voltage levels to the electronic circuits including the electro-optic devices. The electrical conductors can also provide strengthening members for the cable to protect the fiber optic transmission members.

SUMMARY OF THE INVENTION

An electrical and fiber optic connector assembly is needed to terminate the electrical conductors and fiber optic transmission members of such a cable so that the electrical conductors are electrically connected to electrical terminals latchably mounted in a housing member and for electrical connection to electrical pads of a circuit board, and the fiber optic transmission members are optically connected to transmitting and sensing photoelectric devices which are mounted in the housing member and also electrically connected to electrical terminals latchably mounted in the housing member for electrical connection to electrical pads of the circuit board.

The connector assembly can also take the form of terminating the electrical conductors and fiber optic transmission members of the cable to electrical terminals and fiber optic terminals of a first housing member which is matable with a second housing member mounted onto a circuit board.

The connector assembly can further take the form of a stacking arrangement with a first housing member mounted on a mother board in which second housing members are latchably mounted, the second housing members are terminated to respective cables, and the electrical conductors and fiber optic transmission members thereof are terminated to respective electrical terminals and fiber optic terminals in the second housing members. Photoelectric members are mounted in a third housing member located on a daughter board and the third housing member is matable with the first housing member so that the photoelectric members are coupled with the respective fiber optic terminals of the second housing members.

BRIEF DESCRIPTION OF THE DRAWINGS.

FIG. 1 is an exploded and perspective view of the parts of a right-angled connector assembly for terminating the electrical and optical conductors of a cable, and the photoelectric devices.

FIG. 2 is a view of the connector assembly of FIG. 1 in an assembled condition terminated to the cable and connected to a circuit board.

FIG. 3 is a longitudinal section view of FIG. 2 with the circuit board exploded therefrom.

FIG. 4 is an exploded and perspective view of the parts of an alternative embodiment of a connector assembly.

FIG. 5 is a perspective view of FIG. 4 in an assembled condition.

FIG. 6 is an exploded to longitudinal section view of FIG. 5.

FIG. 7 is a side longitudinal section view of FIG. 6.

FIG. 7A is an enlarged view of the terminating member for the fiber optic transmission member.

FIG. 11 is a top longitudinal section view of FIG. 9,

FIG. 12 is a side longitudinal section view of FIG. 10.

DETAILED DESCRIPTION OF THE INVENTION

Figure 8:
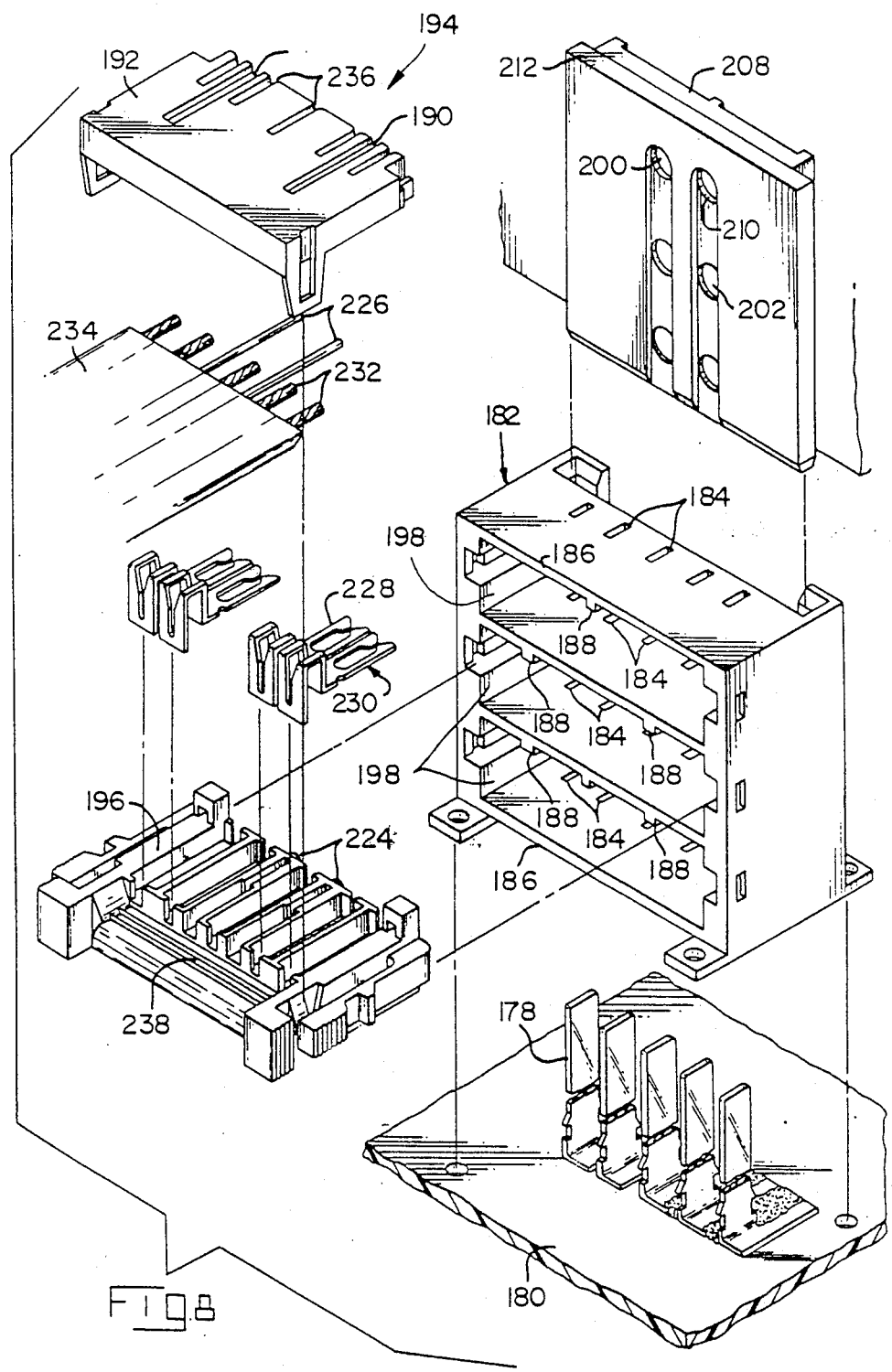
FIG. 8 is an exploded and perspective view of the parts of a further embodiment of the connector assembly.

An L-shaped electrical and fiber optic connector assembly 10 is shown in FIGS. 1 through 3 and includes a housing member 12 and a cable 14. Housing member 12 comprises an L-shaped member 16 and a cover member 18 which are molded from a suitable dielectric material. Terminal-receiving passageways 20 and 22 extend through section 24 of member 16 and they communicate with an opening 26 extending into section 24 from a mating face thereacross. Passageways 20 extend into conductor-receiving termination passageways 28 in section 30 of member 16. Passageways 28 communicate with a cable-receiving channel 32 along which parallel projections 34 extend.

Projections 36 extend outwardly from the top of member 16 and are spaced from one another to define device-receiving cavities in which light-transmitting member 38 and light-receiving member 40 are disposed against surfaces 42 to limit their movement within the cavities. Members 38 and 40 are conventional photoelectric devices and they are packaged in dielectric housing members 44 from which extend electrical leads 46 that are terminated to electrical terminals 48. Electrical leads 46 with electrical terminals 48 terminated thereto are positioned in respective passageways 22 when members 38 and 40 are positioned within their respective cavities against surfaces 42 with lances 50 of electrical terminals 48 engaging surfaces 52 in opening 26 while lugs 54 of electrical terminals 48 engage stop surfaces 56 in passageways 22 thereby latchably securing electrical terminals 48 in position in passageway 22 so that cantilever contact members 58 of electrical terminals 48 are disposed in opening 26.

Cable 14 has a multiplicity of stranded electrical conductors 60 positioned in insulated relationship from one another within dielectric jacket 62. Fiber optic transmission members 64 are disposed between adjacent electrical conductors 60 within jacket 62 and they can be made of plastic material or glass material clad with a coating to protect them. Electrical conductors 60 are terminated to electrical terminals 48 which are secured in passageways 20 by lugs 54 engaging stop surfaces 66 in passageways 20 and lances 50 engaging surfaces 52 in opening 26. Electrical conductors extend along respective passageways 28 in section 30 with dielectric jacket 62 being disposed in channel 32 as shown in FIG. 3.

The ends of fiber optic transmission members 64 are secured in fiber-connecting means such as openings of annular projections 68 of housing members 44 of light-transmitting member 38 and light-receiving member 40 by means of an adhesive material so that the ends of transmission members 64 are properly positioned relative to and optically connected to the photoelectric members thereof. Transmission members 64 are disposed in fiber-receiving passageways 29 in section 30 of member 16. As can be discerned, the terminated transmission members 64 have sufficient play so as not to place any stresses on the transmission members when members 38 and 40 are positioned in their respective cavities.

Cover member 18 has openings 70 which cooperate with projections 72 of member 16 to hingedly connect cover member 18 to member 16 and flexible integral latching members 74 are disposed in recesses 76 of section 30 and latchably engage latching projections 78 thereby latchably securing cover member 18 on member 16 as shown in FIGS. 2 and 3.

Cover member 18 has a projection 80 which is positioned between projections 34 in channel 32 so that projections 34 and 80 dig into jacket 62 as shown in FIG. 3 thereby providing a strain relief for cable 14. Cover member 18 also maintains electrical conductors in passageways 28 and transmission members 64 in passageways 29. The configuration of jacket 62 and channel 32 are complementary with sloping sides to polarize positioning of cable 14 in channel 32 so that conductors 62 and transmission members 64 will be properly connected.

Connector assembly 10 is now connectable onto an edge portion 82 containing electrical pads 84 of a circuit board 86 with edge portion 82 being positioned within opening 26 so that cantilever contact members 58 are electrically connected with respective electrical pads 84. A dove-tailed section of keying member 88 is positioned within a complementary recess 90 in section 24. A number of recesses 90 are disposed along section 24 so that keying member 88 can be positioned in selected ones thereof so that keying member 88 in conjunction with projection 92 will mate with recesses 94 in a panel 96 thereby polarizing the connection of connector assembly 10 with circuit board 86.

FIGS. 4 through 7 illustrate connector assembly 98 which is an alternative embodiment of the invention and which includes dielectric receptacle housing member 100 and dielectric plug housing assembly 102 axially matable therewith. Receptacle member 100 is secured onto a circuit board 104 to which tab-like electrical bus bars 106, light-transmitting device 108 and light-receiving device 110 are electrically connected. Bus bars 106 extend through receptacle housing member 100 and the top ends thereof are disposed in slots 112 of receptacle housing member 100. Light-transmitting device 108 is disposed in a profile bore 114 of receptacle housing member 100 whereas light-receiving device 110 is disposed in profiled bore 116 as best shown in FIGS. 6 and 7. Profiled bores 114 and 116 are in communication with plug-receiving cavity 118 of receptacle housing member 100 at the rear thereof which defines a receptacle connection interface, along which interface bus bars 106 are vertically disposed. Latching recesses 120 are located in the sides of receptacle housing member 100. Electrical probes can be readily inserted in slots 112 to test the condition of bus bars 106.

Plug housing assembly 102 comprises a plug housing member 122 and a cover member 124. Plug housing member 122 has terminal-receiving areas 126 and conductor-receiving passageways 128 in communication therewith. Passageways 128 are in communication with a cable-receiving channel 130 which has a recess 132 extending thereacross.

Electrical terminals 134 have terminating sections 136 in the form of spaced transverse slotted beams that are terminated to electrical conductors 138 of cable 140 whereafter the electrical terminals 134 are positioned in terminal-receiving areas 126 with electrical conductors 138 disposed in passageways 128. Forked contact sections 142 of electrical terminals 134 are in alignment with bus-receiving slots 144 at the front end of plug housing member 122, the entrances to slots 144 being beveled as shown in FIG. 6. The front end of plug housing member 122 comprises a connector interface thereof.

Fiber optic transmission members 146 of either clad coated plastic or glass of cable 140 are disposed in fiber-receiving passageways 148 of plug housing member 122 and transmission members 146 extend through bores 150 at the front end of member 122 with the ends of transmission members 146 being positioned within a fiber end-receiving means comprising axially extending channels 151 (as shown in FIG. 7A) of paired semicylindrical projections 152 which are spaced from one another and the ends of transmission members 146 are disposed in the plane of the outer ends of projections 152. A suitable adhesive is utilized in bores 150 to secure transmission members 146 therein. Bumps 153 are located on the exterior surfaces of projections 152 and spaced therearound.

Cover member 124 has L-shaped projections 154 which are matable within channels 156 in communication with slots 158 of plug housing member 122 to hingeably mount cover plug housing member 124 onto section 122 and integral flexible latching members 160 are disposed in slots 162 and latchably engage onto latching projections 164 therein thereby latchably securing cover member 124 in position on plug housing member 122 as shown in FIGS. 5 and 7. The inside surface of cover member 124 includes spaced projections that extend into each of terminal-receiving areas 126 on each side of terminating sections 136 to thereby maintain electrical conductors 138 within the slots of terminating sections 136. Cover member 124 also maintains transmission members 146 in passageways 128 and they have freedom of movement therein. Bus-receiving slots 168 are also located in cover member 124 in correspondence with bus-receiving slots 144 of plug-housing member 122. Integral flexible latching arms 170 extend outwardly from the sides of plug housing member 122 and extend rearwardly therealong to free ends. Latching arms 170 contain projections 172 for matable engagement with respective latching recesses 120 in receptacle housing 100 when plug housing assembly 102 is axially received within plug-receiving cavity 118 of receptacle housing 100. When plug housing assembly 102 assembled to cable 140 is received into receptacle housing 100, semicylindrical projections 152 to be disposed within small sections 174 (shown in FIGS. 7 and 7A) of profiled bores 114 and 116 so that small bore sections 174 cause semicylindrical projections 152 to clamp onto and center fiber optic transmission members 146 relative to the axis of bores 114 and 116 via the action of bumps 153 and the ends of the transmission members are positioned against light-transmitting device 108 and light-receiving device 110. Bus bars 106 are disposed within slots 144 and 168 of plug housing assembly 102 and are axially aligned so that forked contact sections 142 of electrical terminals 134 are electrically connected therewith. A projection 176 of cover member 124 opposite recess 132 cable-receiving channel 130 forces a section of cable 140 into recess 132 as shown in FIG. 7 thereby providing a strain relief for cable 140. Also, channel 130 and the jacket of cable 140 have complementary configurations in the same manner as that of the embodiment of FIGS. 1 through 3 for the same reason.

Figures 9, 10:
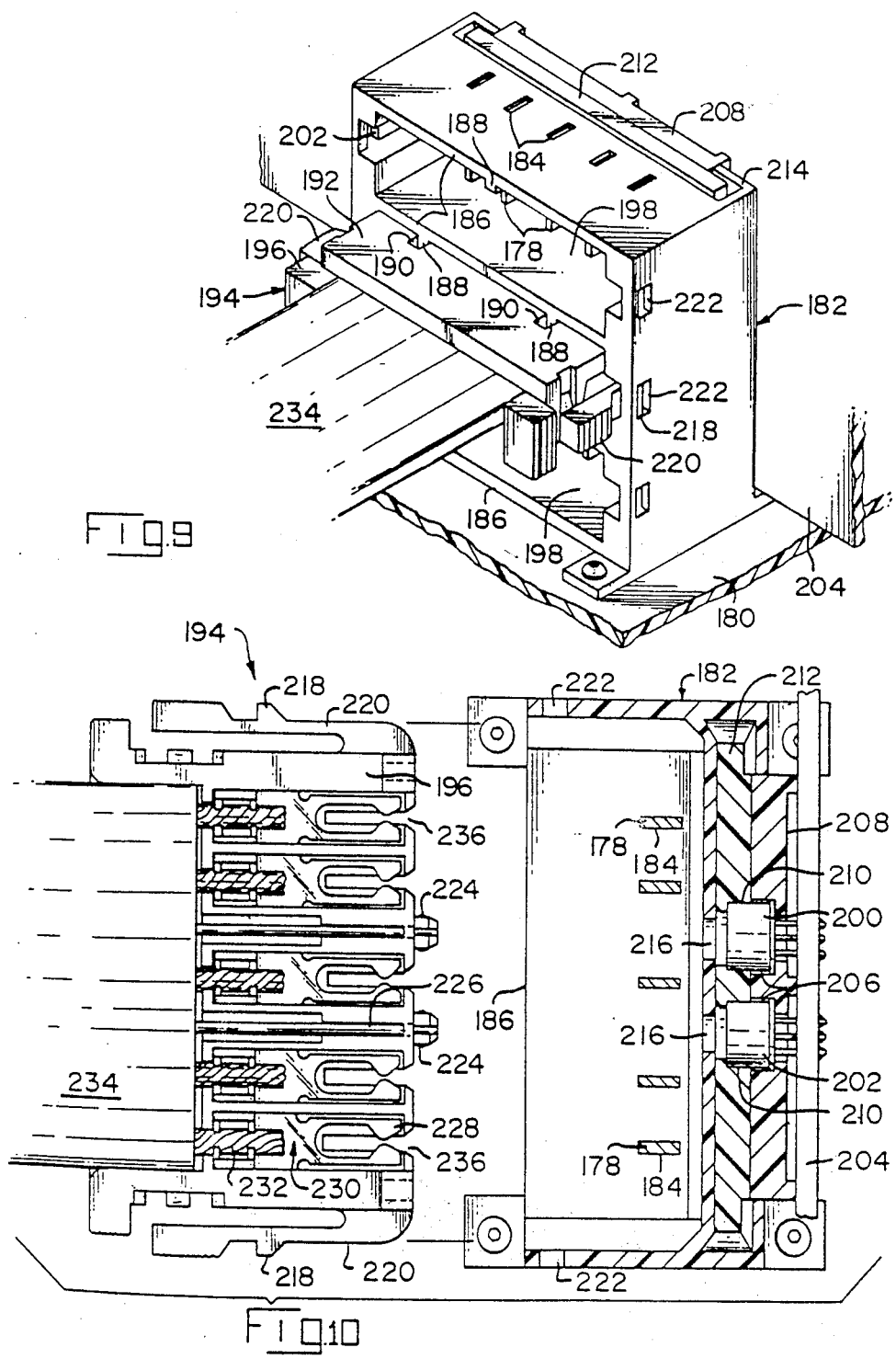
FIG. 9 is a perspective view of FIG. 8 in an assembled condition.
FIG. 10 is an exploded top longitudinal section view of FIG. 9.

The embodiment of FIGS. 8 through 12 is similar to that of FIGS. 4 through 7 and only the differences therebetween will be described as it is not necessary to describe the common features therebetween. Dielectric receptacle housing shell member 182 is mountable to mother board 180 and has a plurality of plug-receiving cavities 198 separated by barrier walls. Cavities 198 extend thereinto from the front to a rear receptacle wall which defines a connector interface, to receive plug housing assemblies 194 thereinto. Each plug housing assembly 194 comprises plug housing member 196 and cover member 192 which together with terminals 230 terminate cable 234. Electrical bus bars 178 are electrically connected onto mother board 180 and receptacle shell member 182 is secured onto board 180 with bus bars 178 extending through slots 184 in walls 186, the tops of bus bars 178 being disposed in slots 184 of the top one of walls 186 as shown in FIG. 12. The lower surface of each of walls 186 (except the bottom wall) has a projection or projections 188 which mate with a slot or slots 190 in a cover member 192 which is latchably secured onto plug housing member 196. Plug housing assembly 194 can then only be inserted within a plug-receiving cavity 198 of housing shell member 182 when a projection or projections 188 on walls 186 coincide with a slot or slots 190 of plug housing assembly 194. In this way, plug housing assemblies 194 are properly inserted within housing-receiving areas 198 of housing shell member 182 in a polarized manner. Plug housing assemblies 194 are latchably secured within respective plug-receiving cavities 198 of receptacle housing shell 182 via latching projections 218 on integral flexible latching arms 220 disposed within latching recesses 222 of shell 182.

A series of conventional light-transmitting members 200 and light-receiving members 202 are electrically connected to a daughter board 204 while being mounted in openings 206 of a heat sink member 208 and also in openings 210 of mounting board 212 with openings 210 being coincident with respective openings 206. Heat sink member 208 and mounting 212 comprising a device-retaining assembly securable to receptacle housing shell member 182. Mounting board 212 is disposed against the rear surface of housing shell member 182 and held thereagainst by projections 214 between which heat sink member 208 is disposed. When mounting board 212 is positioned against the rear wall of housing shell member 182, openings 210 are in alignment with respective apertures 216 in the rear wall to receive semicylindrical projections 224 thereinto which have the ends of fiber optic transmission members 226 secured therein. Semicylindrical projections 224 have bumps therearound like those of projections 152 shown in FIGS. 7A and secure the fiber ends therewithin when engaged with apertures 216 and extend forwardly into openings 210 so that the ends of the fiber optic transmission members 226 are disposed in engagement with light-transmitting members 200 and light-receiving members 202. Forked contact sections 228 of electrical terminals 230 which are terminated to electrical conductors 232 of cable 234 electrically connect with respective axially aligned portions of bus bars 178 when housing members 194 are latchably positioned within plug-receiving cavities 198 of housing shell member 182 with forked contact sections 228 being in alignment with aligned slots 236 in cover member 192 and terminal-receiving member 196 of plug housing assembly 194 which accommodate bus bars 178.

Channel 238 accommodates cable 234 in the same polarized manner as that of the embodiments of FIGS. 1 through 3 and 4 through 7.

Electrical bus bars 106 and 178 can be connected to the same voltage level or they can be at different voltage levels or alternatively electrical conductors 138 and 232 can supply voltages at the same voltage level or different voltage levels to bus bars 106 and 178. The embodiment of FIGS. 8 through 12 enables housing members 194 to be stackably connected within housing shell member 182 in order to accommodate various electronic functions of interconnected electronic equipment.

The housed members 38 and 40 of FIGS. 1 through 3 can be used in the embodiments of FIGS. 4 through 7 and 8 through 12 if desired, and the transmission members can be terminated thereto in the same manner as that of FIGS. 1 through 3.

We claim:

1. An electrical and fiber optic connector assembly for terminating a cable having electrical conductors and fiber optic transmission members, for electrical connection of the electrical conductors to conductive members of an electrical article and optical connection of the fiber optic transmission members to photoelectric devices and then electrically connecting the photoelectric devices with other conductive members of the electrical article, comprising:

a dielectric housing having a termination section including a cable-receiving channel and including conductor-receiving passageways and fiber-receiving passageways extending forwardly from said channel, device-receiving cavities at forward ends of said fiber-receiving passageways, and terminal-receiving passageways extending inwardly from a mating face and in communication with said conductor-receiving passageways and said device-receiving cavities, said conductor-receiving passageways adapted to receive said conductors having first terminals terminated thereon and said fiber-receiving passageways adapted to receive and selectively locate end portions of said fiber optic transmission members;

photoelectric devices associated with respective said fiber optic transmission members and having fiber-connecting means for optical connection with said fiber optic transmission members, said photoelectric devices having electrical leads extending therefrom with second terminals terminated thereon, said photoelectric devices being located in said device-receiving cavities such that said fiber-connecting means are located at forward ends of said fiber-receiving passageways and said second terminals on said electrical leads are located in respective said terminal-receiving passageways proximate said mating face; and a cover member securable to said housing at said termination section after said cable is received therealong and is adapted to secure and strain relieve said cable in said housing and to secure said conductors and said fiber optic transmission members in respective said conductor-receiving and fiber-receiving passageways and to secure said photoelectric devices in said housing, whereby said end portions are receivable along said fiber-receiving passageways and are optically connectable to said photoelectric devices at and by said fiber-connecting means thereof, and said terminated conductors are receivable along said conductor-receiving passageways such that said first terminals are located in respective said terminal-receiving passageways proximate said mating face, after which said cover member secures said cable to said housing and said conductors and said fiber optic transmission members therewithin for connection to respective conductive members of an electrical article at said mating face.

2. An electrical and fiber optic connector assembly as set forth in claim 1 wherein said second terminals are aligned and opposed from said first terminals and said second and first terminals include opposed cantilever spring contact arms disposed in a housing opening extending inwardly from said mating face to receive therebetween an edge portion of a circuit board and engage and electrically connect to respective conductive pads of said circuit board.

3. An electrical and fiber optic connector assembly as set forth in claim 2 wherein said housing member includes selectable keying members proximate said opening to cooperate with recesses in a panel through which said edge portion of said circuit board extends, thereby polarizing the connection of the connector assembly and said circuit board.

4. An electrical and fiber optic connector assembly as set forth in claim 1 wherein said housing is L-shaped and said mating face receives said electrical article at a right angle to a said cable extending from said housing.

5. An electrical and fiber optic connector assembly as set forth in claim 1 wherein said photoelectric devices comprises a light-transmitting member and a light-receiving member each disposed in a respective dielectric package member, said package member including said fiber-connecting means.

6. An electrical and fiber optic connector assembly as set forth in claim 1 wherein said fiber-connecting means comprise annular projections on respective said photoelectric devices to receive thereinto ends of respective said fiber optic transmission members.

7. An electrical and fiber optic connector assembly as set forth in claim 6 wherein at least one of said housing and said cover member is adapted to provide space along said fiber-receiving passageways remote from said photoelectric devices whereinto respective said fiber optic transmission members are permitted to flex when said fiber ends are received into said fiber-connecting means and said cable is secured to said housing by said cover member whereby said optically connected fiber optic transmission members are unstressed.

8. An electrical and fiber optic connector assembly as set forth in claim 1 wherein said termination section of said housing includes polarizing means cooperative with corresponding polarizing means of said cable for polarized receipt of said cable in said housing.

9. An electrical and fiber optic connector assembly for terminating a cable having electrical conductors and fiber optic transmission members, for electrical connection of the electrical conductors to conductive members of an electrical article and optical connection of the fiber optic transmission members to photoelectric devices and then electrically connecting the photoelectric devices with other conductive members of the electrical article, comprising:

a dielectric receptacle housing including a plug-receiving cavity extending inwardly thereinto to a connection interface and further including photoelectric devices and terminal buses secured therein at selected locations along said connection interface, said photoelectric devices and terminal buses including respective contact means extending outwardly from said receptacle housing to engage and electrically connect to corresponding contact means of a mating electrical article; and a dielectric plug housing assembly including a plug housing member and a cover member, said plug housing member including a cable-receiving channel and conductor-receiving passageways and fiber-receiving passageways extending forwardly from said cable-receiving channel to a connection interface of said plug housing member, said conductor-receiving passageways including terminal-receiving areas in communication with and extending rearwardly from said connection interface within which respective terminals are securable which terminate respective said conductors of said cable, said connection interface being adapted to receive contact portions of said terminal buses of said receptacle housing from forwardly thereof upon receipt of said plug housing assembly axially into said plug-receiving cavity of said receptacle housing to electrically engage corresponding contact means of said terminals in said plug housing assembly, and said plug housing member further including fiber end-receiving means along said connection interface at forward ends of respective said fiber-receiving passageways adapted to receive and center end portions of respective said fiber optic transmission members of said cable and positioned and further adapted to align with and optically connect said fiber end portions to respective said photoelectric devices upon receipt of said plug housing assembly axially into said plug-receiving cavity of said receptacle housing, and said cover member being securable to said plug housing member after said cable is received thereinto and is adapted to secure and strain relieve said cable and secure said terminals and said conductors and fiber optic transmission members of said cable in said plug housing member; and means securing said plug housing assembly in said plug-receiving cavity of said receptacle housing.

10. An electrical and fiber optic connector assembly as set forth in claim 9 wherein said fiber end-receiving means each comprise a pair of opposing semicylindrical projections having a space therebetween axially along which are centered facing channels cooperating to engage and hold in centered and axial alignment a said end of a respective said fiber optic transmission member disposed therein.

11. An electrical and fiber optic connector assembly as set forth in claim 10 wherein said receptacle housing includes a bore extending from each said photoelectric device forwardly to said connector interface of said receptacle housing to receive force-fit thereinto an associated said pair of semicylindrical projections having a said fiber end therein and small bumps spaced therearound upon receipt of said plug housing assembly axially into said plug-receiving cavity of said receptacle housing for optically connecting each said fiber end to a respective said photoelectric device whereby said semicylindrical projections are forced against and clamp respective said fiber ends.

12. An electrical and fiber optic connector assembly as set forth in claim 9 wherein terminal buses include tab-like terminal-engaging contact sections extending into said plug-receiving cavity forwardly of said connector interface of said receptacle housing and vertical to the axis of connection, and said connector interface of said plug housing assembly includes corresponding vertical slots into which said tab-like contact sections are received to be disposed in electrical engagement between tines of a forked contact section of a respective terminal in said plug housing assembly.

13. An electrical and fiber optic connector assembly as set forth in claim 9 wherein said securing means comprises latching projections extending outwardly from sides of said plug housing assembly and disposed on inwardly deflectable latch arms thereof, and latchable in corresponding latching recesses along sides of said plug-receiving cavity of said receptacle housing, said latch arms further including free ends extending rearwardly along said plug housing assembly and outwardly from said receptacle housing upon full assembly enabling inward deflection of said latch arms to delatch and remove said plug housing assembly from said receptacle housing.

14. An electrical and fiber optic connector assembly as set forth in claim 9 wherein each said terminal includes a conductor-connecting section comprising a pair of transverse slotted beams to receive an end portion of a respective said conductor forced into the slots thereof from laterally thereof.

15. An electrical and fiber optic connector assembly as set forth in claim 9 wherein said receptacle housing includes slots therein to receiving electrical test probes thereinto to test the condition of said terminal buses.

16. An electrical and fiber optic connector assembly for a terminating plurality of like cables each having electrical conductors and fiber optic transmission members, for electrical connection of the electrical conductors to conductive means of an electrical article and optical connection of the fiber optic transmission members to respective photoelectric devices and then electrically connecting the photoelectric devices with other conductive members of the electrical article, comprising:

a like plurality of similar dielectric plug housing assemblies each terminated to a respective said cable and including electrical terminals terminated to respective said electrical conductors, said terminals including forked contact sections proximate a connector interface of a said plug housing assembly, said connector interface including fiber-aligning means of forward ends of fiber-receiving passageways of said plug housing assembly to receive and hold axially aligned therein stripped ends of respective said fiber optic transmission members;

a receptacle housing shell having a like plurality of plug-receiving cavities separated by barriers and adapted to receive respective said plug housing assemblies axially thereinto such that the connector interfaces of said plug housing assemblies are adjacent a rear wall of said receptacle shell, the inside surface of said wall comprising a connector interface of said receptacle shell, said receptacle shell rear wall having secured therebehind a device-retaining assembly secured thereto including a plurality of photoelectric devices corresponding to and aligned with respective apertures of said rear wall and respective said fiber end-receiving means with said ends of said fiber optic transmission members of said plug housing assemblies upon assembly thereinto, each said photoelectric device having electrical leads extending outwardly from said device-retaining assembly to be electrically connected to said other conductive members of the electrical article, and said receptacle shell including secured therein a plurality of vertical bus bars forwardly of said rear wall and extending through slots through said barriers, said bus bars extending outwardly from said receptacle shell for termination to said conductive means of the electrical article, said bus bars including at least portions being axially aligned with one said electrical terminal of each of said plug housing assembly to be received into corresponding vertical slots of each said plug housing assembly extending rearwardly from a said connector interface thereof and to be received between tines of a said forked contact section of a said terminal to be electrically engaged therewith upon receipt of each said plug housing assembly axially into a respective said plug-receiving cavity of said receptacle shell; and means securing each said plug housing assembly in a respective said plug-receiving cavity of said receptacle shell.

17. An electrical and fiber optic connector assembly as set forth in claim 41 wherein said device-retaining assembly comprises a forward wall member having a plurality of profiled bores therethrough having larger diameter sections along a rear surface thereof, and a rearward wall member having a like plurality of profiled bores therethrough aligned with said profiled bores of said forward wall member and having larger diameter sections along a forward surface thereof, said photoelectric devices being retainingly disposed in the paired large diameter bore sections of said forward and rearward wall members with said electrical leads thereof extending through small diameter bore sections of said rearward wall member and rearwardly therefrom, and said smaller diameter bore sections of said forward wall member adapted to receive respective forward ends of said fiber end-receiving means of said plug housing assemblies.

\* \* \* \* \*

UNITED STATES PATENT OFFICE
CERTIFICATE OF CORRECTION

Patent No. 4,678,264     Dated July 7, 1987

Inventor(s) Terry P. Bowen, Douglas W. Glover, Charles D. Hoover, John H. Huber, Ronald R. Schaffer It is certified that error appears in the above-identified patent and that said Letters Patent are hereby corrected as shown below:

Claim 17, line 2, Column 10, change "41" to ---16---; line 11, change "large" to ---larger---; line 13, change "small" to ---smaller---.

Signed and Sealed this

Nineteenth Day of January, 1988

Attest:

DONALD J. QUIGG

Attesting Officer     Commissioner of Patents and Trademarks